Dec. 15, 1964  C. E. SUTHERLAND ETAL  3,161,089
REMOVING OR TIGHTENING THREADED FASTENERS USING IMPACT WRENCHES
Filed Feb. 9, 1962
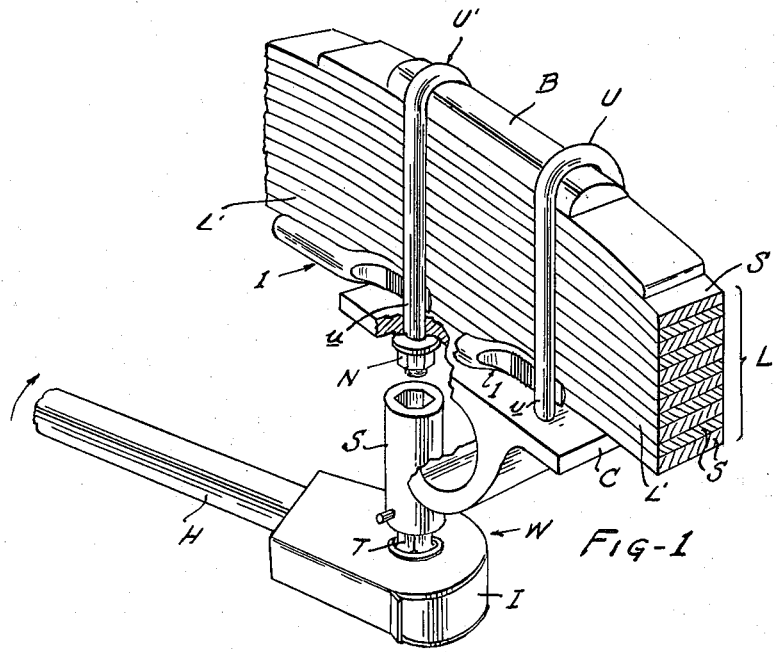
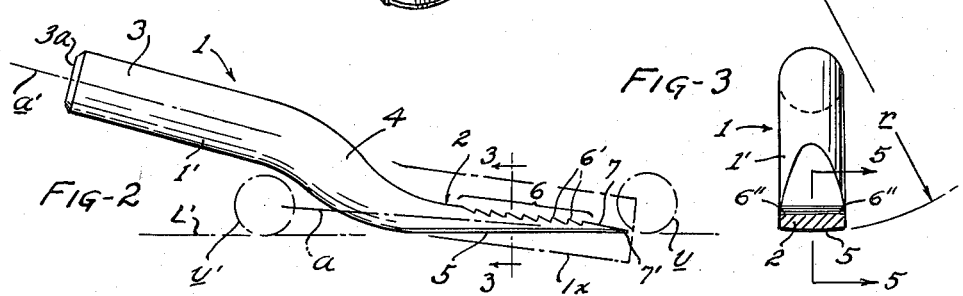
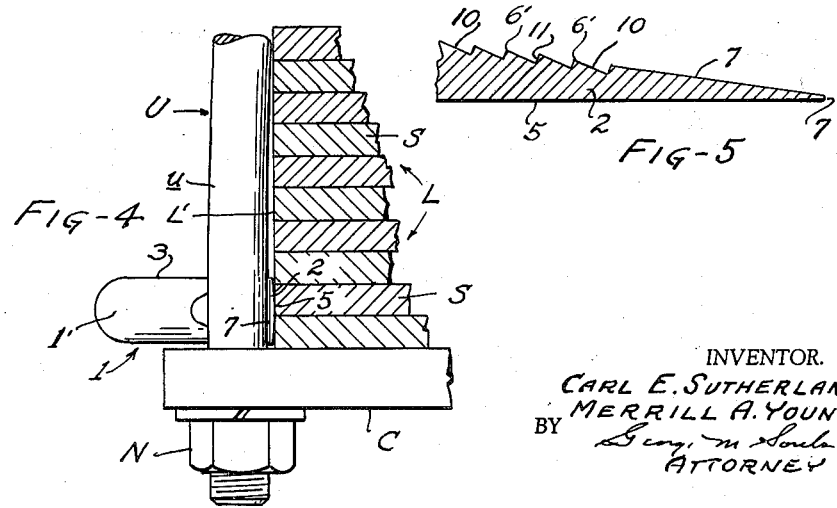
INVENTOR.
CARL E. SUTHERLAND
MERRILL A. YOUNG
BY
ATTORNEY United States Patent Office 3,161,089
Patented Dec. 15, 1964

3,161,089
REMOVING OR TIGHTENING THREADED
FASTENERS USING IMPACT WRENCHES
Carl E. Sutherland, Cleveland, and Merrill A. Young, Gates Mills, Ohio, assignors to Curtiss-Wright Corporation, a corporation of Delaware
Filed Feb. 9, 1962, Ser. No. 172,277
3 Claims. (Cl. 81—13)

This invention relates to a simple and effectual device and method for preventing dissipation of impact torque increments in the operation, as by a manual impact wrench, of tightening or removing threaded fasteners on or from elongated threaded shanks of circular cross-section disposed in positions such as to render application of holding torque to the shanks adequately close to the fasteners extremely difficult or impracticable. Such difficulty or impracticability in automotive and other vehicle equipment repair and service is commonly due to lack of sufficient room or working space for conventional holding tools such as clamps or pipe or rod wrenches.

A typical problem solved by the use of this invention is presented in the case of having to remove "frozen" nuts from U-bolts or L-bolts on motor vehicle leaf spring suspension assemblies of various types for axles or other load carrying members. In that and similar situations the U-bolts or equivalents (which incidentally are of very high quality steel hence expensive) have their bight or bow portions seated on saddle blocks or plates, as above or below the stack or assembly of spring leaves, depending upon the type of suspension involved, and the shanks extend close to or against the leaves, straddling the leaves; thence through opposite mounting or saddle blocks or brackets, which, again depending upon type, may suspend for example axles or cross-bars via the spring leaf assemblies on the vehicle frames. In the case of simple cantilever spring suspensions the U-bolts usually secure the base or anchor end regions of associated spring assemblies to the vehicle frames.

The U-bolts in any case are held by their fastening nuts or nut and washer assemblies under extremely high tensions such as will adequately resist load-imposed forces as on bumpy roads. Since the bolt threads and nuts are critically exposed to corrosive influences of weather, salt and dirt, the nuts, after relatively short periods of service, become "frozen" on their bolt threads as though welded thereto. In event for example one of the spring leaves requires replacement the entire spring assembly is dismounted; and commonly the expensive U-bolts are destroyed in the process of burning off the nuts. In case commonly available wrench equipment is used in attempting to remove frozen nuts of U-bolts, the shanks are very apt to be twisted apart because of their relatively long free length hence torsional yieldability and lack of accessability for holding clamps or grippers close to the fasteners.

Considered as a method of operation in preventing dissipation of torque in the operation of an impact wrench to remove or apply a threaded fastener from or onto an L-bolt, U-bolt or the like having a circular shank extending in close or abutting relationship to a face surface on a rigid support for the bolt parallel therewith but unattached thereto, the present invention comprises, inter alia, forcing a serrated wedge between the shank and such face surface and so disposed that the serrations of the wedge lie adjacent and in torque-flexure-resisting contact with the shank.

The present invention is also applicable in any situation where a long bolt or rod extends relatively close to a member such as the flange of an angle bar or channel and thence through a securing plate or pad to the fastening nut.

Objects and features of the invention not indicated above will become apaprent from the following description of the preferred embodiment shown in the drawing. The essential characteristics are summarized in the claims.

In the drawing FIG. 1 is a fragmentary perspective view of a typical vehicle spring suspension assembly including two U-bolts, and a manual impact wrench and socket unit or assembly in position for application to the fasteners, the view also showing the holding device hereof in one form.

FIG. 2 is a side view of the holding device.

FIG. 3 is a sectional view taken as at 3—3 on FIG. 2.

FIG. 4 is a fragmentary cross-sectional view through part of a spring suspension assembly and showing (exaggeratedly) a U-bolt shank as it will usually be deflected away from the leaf spring assembly when the holding device hereof is used.

FIG. 5 is a sectional view taken at line 5—5 in FIG. 3.

In FIG. 1 the typical assembly or stack L of leaf springs is shown as secured intermediately of its ends between saddle block B and a complementary mounting plate C such as a pillow block of a cross-bar or axle, not shown, and two U-bolts U and U' clamping the blocks together against the stack or assembly L of spring leaves as by fasteners one of which is shown at N.

The manual impact wrench W, shown with a wrench socket S snugly fitting the output shaft or tool head T thereof in position to engage the nut N, represents one form of a tool being manufactured and sold by the assignee hereof under the registered trademark "Swench." In the Swench a power spring, not shown, is mounted in the operating handle H; an annular inertia member or rotor I supported coaxially with the tool head T carries pawl elements, not shown, operating on a ratchet toothed portion of the output shaft or tool head; and the tool (via cam-operated escapement mechanism, not shown) produces, through force alternately stored in and released by the spring, successive sharp and powerful impacts, via the tool head T and socket S, to tighten or loosen the fasteners such as N. The herewith partially illustrated example of a Swench is substantially that disclosed by United States Patent 2,954,714 of Oscar J. Swenson.

The handle H is operable as a ratchet back and forth through a predetermined angular distance or unidirectionally, depending upon available space, and after each impact occurs the torque applied by the tool head T drops substantially to zero. Thus in the typical illustrative use depicted in FIG. 1 if the bolt shanks $u$ do not have substantial torsional rigdity but instead have torsional flexibility within the elastic limits of the metal employed in their formation the shanks will be angularly deflected unitarily with the nuts and will spring back to original position after each impact. This action is as distinguished from the action which would have occurred had the shanks $u$ been for example welded to the pillow block C. In the latter event the successive impacts by the wrench W are in effect stored and stacked through friction involved in the threaded connection or between the axial face of the fastener or fastener assembly and such rigid support C, so that the next succeeding impact will take up where the previous impact discontinued, either to turn the fastener toward the spring assembly L or (in the case of removing the fastener) will commence to break it loose.

The present method of operation to remove or tighten threaded fasteners of U-bolts, L-bolts and others similarly situated—as outlined above—may be practiced effectually for example through employment of a simple hard metal wedge device 1, FIGS. 1 and 2, one main side face 6 of which is serrated or roughened as by having, in effect, ratchet teeth 6' formed on and along it near the entering or leading edge 7', sloping away therefrom and extending over a sufficient area lengthwise of the wedge so that (despite deflection of the bolt shank away from the support or initial spacing of it from the support bearing distances), the wedge device can easily be applied in working position and will be retained solidly in place largely by friction and can be removed easily after tightening or loosening of the fastener or fasteners.

U-bolts on vehicle suspension assemblies of the type illustrated herewith by way of example, are usually installed in pairs (sometimes more, e.g. three), and spaced apart minimum distances such that, in the case of a pair of bolts, as U and U', FIG. 1, will retain typical assemblies such as the partially illustrated stack or group L of spring leaves S (in cooperation with various vehicle frame sill members or pillow blocks, saddle plates and the like— e.g. brackets such as C, FIG. 1) in position against undesired displacement (as in the principal planes of the individual spring leaves S, at least some of which are apt otherwise to be insecurely held against such displacement).

The shanks $u$ of pairs of U-bolts such as U and U' on average motor vehicles are very seldom spaced apart less than around 3 inches and seldom more than around five inches (greater spacing on larger vehicles of course and in metal building structures etc., requiring bolts of large diameters).

Typical bolt shank spacing as just above outlined presents an important problem (particularly in view of lack of working space in the necessary work regions as well known to automobile repair men) since—as in the situation illustrated by FIG. 1—the wedge device 1, or one of such if two are used concurrently, must be placed between the bolts U and U' against the supporting face L' in order to enable the devices 1 to be forced into position to resist torsional deflection in the proper rotational direction. Thus if the nut N in FIG. 1 is to be loosened the working portion 2 of the wedge device 1 must be accommodated between the bolt shanks so that tendency of the shank to turn about its axis will also tend to move the wedge point farther in.

In view of the above described problem situation the preferred form of the wedge device 1, as shown in FIGS. 1 and 2, is that of an elongated substantially rigid, hard metal block or bar 1' having a working end portion 2 of suitably narrow wedge shape (e.g. 8° taper as shown) and a driving head or shank portion 3 offset from the working end portion as by a double (ogee type or goose neck) curved intermediate portion 4. The offset distance and angular relationship (optional) of the tool portions 2 and 3 are selected or designed according to working environment such that when the working end portion 2 is lying full length against the supporting surface L' between the bolt shanks $u$ (in other words ready to be driven under the shank $u$ as diagrammatically shown at the right in FIG. 2), the head portion 3 will amply clear the similarly illustrated bolt shank $u'$ and be in a position such that the end face $3a$ of the head portion will be effectually disposed so as to be conveniently and forcibly struck as by a hammer and in such manner that approximately or substantially the full force of the blow or blows of the hammer can be delivered approximately along the longitudinal axis $a$ of the working or wedge point portion 2.

As illustrated in FIG. 2, the longitudinal axis $a'$ of the head or shank portion 3 of the tool 1 is displaced about 11° from the axis $a$ or 15° from the longitudinally straight face 5 of the working end or wedge portion 2. The angular relationships mentioned are not presently believed critical and may be varied within reasonable limits as required by (e.g.) working space conditions or others.

The tool 1 can be made economically from round bar stock (tool steel or high carbon steel for example, suitably at least "case" hardened) or can be forged nearly to finished shape. If made from such bar stock as mentioned ("blank" shape partly illustrated by broken lines $lx$) the front face of the blank (toward axis $a'$) is suitably machined to provide the toothed region 6 and the opposite or bottom side is machined to provide the face 5 which is preferably generously curved as will be further explained.

The teeth or serrations 6' in region 6 are preferably of ratchet form and with their transverse directions parallel to a leading or entering straight edge 7' or wedge point proper of the tool. The teeth 6', as shown, have major faces 10 sloping away from the wedge point 2' toward the head portion 3, as at approximately 24° to the under face 5, and minor faces 11, disposed to block rotation of the bolt shanks in the desired direction to prevent deflection, disposed nearly normal to the working end axis $a$. The teeth or serrations 6' can be of uniform depth, as illustrated, or those nearer the leading edge 2' than others can be shallower (not shown) to avoid critical reduction of cross section of the working end hence tendency to fracture in case the tool is used carelessly. The front face portion 7 adjacent the wedge point 2' is smooth or planar for a short distance to preserve necessary strength and to facilitate initial entering of the wedge point into working position.

The back face 5 of the working end portion of the tool, as shown by reference to FIG. 3, is curved as on a radius $r$ or compound radii as desired. Radius $r$ in the illustrated size of the tool can be roughly four times the diameter of the head 3, as one example. As the working end portion 2 is being driven between the bolt shanks and the supporting face L' of spring assembly L, the transversely curved face 5 allows the points of the serration teeth 6' to lie in full length contact with the bolt shanks (tooth "length" being horizontally as viewed in FIG. 3). In other words the teeth themselves and not the back surface 5 determines the working position of the teeth with reference to the bolt shanks.

In operation the device 1 is simply forced (as by being driven with a hammer striking the head face $3a$ or a socketed extension—not shown—slipped over the head 3) between the bolt shank $u$ and the adjacent stack or assembly of spring leaves L until the teeth 6' have engaged the bolt shank. The device 1 is then held in place by friction augmented by indenting or attempted indenting contact of the teeth with the bolt shank. The indenting contact force is increased if the shank through torsional flexure moves in a direction to draw the wedge farther in. Thus the tool needs no attention while the fastener N is being loosened or tightened by impacts delivered thereto as by the impact wrench W.

It will be evident from FIG. 4 that the rounded back surface 5 (which may if necessary be lubricated) provides a rocker against the generally flat face L' formed by the usually vertically aligned edges of the various spring leaves S so that the serration teeth 6' can make contact for their full length with the respectively engaged surfaces of the bolt shank.

After the nut N is tightened or loosened as the case may be the device 1 can be easily dislodged by striking the head 3 transversely of its axis alternately from opposite sides as with a hammer. During extraction of the tool 1 from working positions the "end" portions 6" FIG. 3 of each engaged tooth act alternately as pivots while the opposite end portions 6" work their way out either by cutting the metal of the bolt shanks or springing the shanks when they are too hard to cut. Meanwhile the smooth rounded back surface 5 offers negligible frictional resistance to withdrawing of the tool and (particularly if lubricated) is of positive assistance to moving the tool in the extracting direction.

Due to the high quality of metal stock used to form the U-bolts, the shank portions $u$ will usually spring back from the exaggeratedly illustrated deflected position as in FIG. 4 so as again to lie against the adjacent faces L of the spring leaves.

We claim:
1. A method of preventing dissipation of torque through flexure in the operation of an impact wrench to remove or apply a threaded fastener from or onto an L-bolt, U-bolt or the like having a circular shank extending in close or abutting relationship to a face surface on a rigid support for the bolt extending along but unattached thereto, comprising forcing a serrated wedge between the shank and such face surface in a region close to the fastener and disposed in such position that the serrations of the wedge lie adjacent and in torque-flexure-resisting contact with the shank.

2. In the operation of an impact wrench on a fastener threaded to an L-bolt, U-bolt or the like and having a circular shank portion extending adjacent a rigid supporting surface disposed beyond the location of the fastener thereon along the axis of the shank and of such free length as to tend to flex torsionally and dissipate the impact forces between application of successive impacts, the method comprising driving or otherwise forcing a hard metal wedge having coplanar serrations on one face thereof between the shank and rigid surface in a region close to the fastener and into such position that the common plane of the serrations is in generally tangential relationship to the adjacent circular surface of the shank.

3. An auxiliary tool for an impact wrench for use in preventing dissipation of impact torque via the shanks of U-bolts, L-bolts and the like extending adjacent rigid supports, said tool comprising a rigid elongated hard metal device having a generally flat leading wedge-shaped end portion and an opposite head end portion adapted to be struck by a hammer or the like, the wedge-shaped end portion having a coplanar arrangement of serration teeth generally of ratchet from on one face with the longer faces of the teeth longitudinally of the device sloping away from its leading end portion toward its opposite end, the opposite end face being transversely curved on a radius materially longer than the transverse dimension of the thickest portion of the device measured approximately normal to the principal plane of the curved face, said opposite head end portion of the tool being offset from the longitudinal axis of the wedge-shaped portion in a direction away from said opposite face and disposed at a narrow angle to the said longitudinal axis.

References Cited in the file of this patent
UNITED STATES PATENTS

| | | |
|---|---|---|
| D. 168,534 | Council | Jan. 6, 1953 |
| 406,538 | Rickolson | July 9, 1889 |
| 735,251 | Harrison | Aug. 4, 1903 |
| 1,594,081 | Van Duzer | July 27, 1926 |
| 1,939,402 | Moser | Dec. 12, 1933 |
| 2,098,686 | Holm | Nov. 9, 1937 |
| 2,359,677 | Reeves | Oct. 3, 1944 |
| 2,486,022 | Haist et al. | Oct. 25, 1949 |
| 2,504,176 | Brehmer | Apr. 18, 1950 |
| 2,709,385 | Alger | May 31, 1955 |
| 3,074,694 | Erickson | Jan. 22, 1963 |

FOREIGN PATENTS

| | | |
|---|---|---|
| 164,165 | Austria | Oct. 10, 1949 |
| 163,371 | Switzerland | Oct. 16, 1933 |